(12) United States Patent
Bock et al.

(10) Patent No.: US 9,457,738 B2
(45) Date of Patent: Oct. 4, 2016

(54) ENERGY ABSORBERS FOR ROOF SYSTEM AND OTHER VEHICLE STRUCTURES

(71) Applicant: FORD GLOBAL TECHNOLOGIES, LLC, Dearborn, MI (US)

(72) Inventors: Andreas Bock, Monheim (DE); Robert Wagschal, Ruppichteroth (DE); Thomas Keller, Kreuztal (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/841,889

(22) Filed: Sep. 1, 2015

(65) Prior Publication Data

US 2016/0082901 A1    Mar. 24, 2016

(30) Foreign Application Priority Data

Sep. 18, 2014   (DE) .................. 10 2014 218 730

(51) Int. Cl.
   *B60R 13/02*      (2006.01)
   *B60R 13/08*      (2006.01)
   *B60R 21/04*      (2006.01)

(52) U.S. Cl.
   CPC ....... *B60R 13/0815* (2013.01); *B60R 13/0212* (2013.01); *B60R 2013/0287* (2013.01); *B60R 2021/0421* (2013.01); *B60R 2021/0442* (2013.01)

(58) Field of Classification Search
   CPC ....... B60R 21/04; B60R 13/01; B60R 13/02; B60R 13/0815; B60R 13/0212; G10K 11/002
   USPC .................. 296/39.1, 39.3, 214, 187.05; 181/286–295
   See application file for complete search history.

(56) References Cited

U.S. PATENT DOCUMENTS

| | | | |
|---|---|---|---|
| 4,425,981 A * | 1/1984 | Kiesewetter | E01F 8/0035 181/286 |
| 5,731,062 A | 3/1998 | Kim et al. | |
| 6,012,764 A * | 1/2000 | Seksaria | B60R 21/04 280/748 |
| 6,305,494 B1 | 10/2001 | Pfaffelhuber et al. | |
| 6,451,232 B2 | 9/2002 | Barber et al. | |
| 6,578,909 B1 | 6/2003 | Reed et al. | |
| 7,144,071 B2 | 12/2006 | Le Gall et al. | |
| 7,157,034 B2 | 1/2007 | Bristow et al. | |
| 7,182,908 B2 | 2/2007 | Preisler et al. | |
| 7,309,521 B2 | 12/2007 | Brown | |
| 7,357,444 B2 | 4/2008 | Cowelchuk et al. | |
| 7,404,593 B2 | 7/2008 | Cormier et al. | |
| 8,186,748 B2 | 5/2012 | Chickmenahalli et al. | |
| 8,479,876 B2 | 7/2013 | Fetsko et al. | |
| 8,530,015 B2 | 9/2013 | Mendiboure et al. | |
| 2005/0258668 A1 | 11/2005 | Brown | |
| 2007/0046073 A1* | 3/2007 | Ludwig | B60R 13/0206 296/214 |

(Continued)

FOREIGN PATENT DOCUMENTS

| | | |
|---|---|---|
| DE | 4334984 C1 | 1/1995 |
| EP | 0079253 B1 | 2/1986 |

(Continued)

*Primary Examiner* — Dennis H Pedder
(74) *Attorney, Agent, or Firm* — Vichit Chea

(57) ABSTRACT

An energy absorber for an overhead system in a vehicle, wherein the energy absorber comprises a sound absorption device. To improve the sound absorption, it is provided that the sound absorption device comprises at least one acoustic membrane formed within a protrusion formed in an energy absorbing panel member.

13 Claims, 3 Drawing Sheets

(56) References Cited

U.S. PATENT DOCUMENTS

2011/0056763 A1 3/2011 Tanase et al.
2012/0104784 A1 5/2012 Sapak et al.
2013/0320708 A1 12/2013 Klausmann et al.

FOREIGN PATENT DOCUMENTS

EP 0744281 B1 7/2001
GB 1125533 * 8/1968

* cited by examiner

ENERGY ABSORBERS FOR ROOF SYSTEM AND OTHER VEHICLE STRUCTURES

CROSS REFERENCE TO RELATED APPLICATIONS

This application claims priority to patent application 102014218730.3, filed in the German Patent and Trademark Office on Sep. 18, 2014, which is hereby incorporated by reference in its entirety.

STATEMENT REGARDING FEDERALLY SPONSORED RESEARCH

Not Applicable.

BACKGROUND OF THE INVENTION

The present invention relates in general to integrated mechanical and acoustic energy mitigation that incorporate a sound absorption device in body structures of road vehicles, and, more specifically, to a roof system for a passenger cabin having energy absorbing characteristics.

Energy absorbing body structures are often used in the interior surfaces of passenger cabins in vehicles such as in the roof area in order to absorb energy of motion (i.e., mechanical energy) of persons in the passenger compartment hurled against the roof during an accident. Sound absorption devices may also be incorporated with the energy absorber in order to attenuate the noise (i.e., acoustic energy) entering the passenger cabin.

An energy absorber with a sound absorption device is disclosed in WO02/102450, wherein the energy absorber comprises structures of composite material with sound attenuating segments. A thermoplastic fiber mesh with a sound barrier is described as a sound absorption device in U.S. Pat. No. 5,731,062. Meanwhile, U.S. Pat. No. 8,186,748 refers to the possibility of providing a sound absorption device in an overhead system. Modules with energy absorbing structures with a plurality of apertures are disclosed in U.S. Pat. No. 7,404,593.

SUMMARY OF THE INVENTION

It is an object of the invention to provide a crash energy absorber for an overhead system in a vehicle with a simplified sound absorption device.

The stated object is achieved by a sound absorption device comprising at least one acoustic membrane. The membrane is advantageously implemented in the form of a closed film as a plate or film resonator. In an alternative implementation the membrane can form one or a plurality of Helmholtz resonators in combination with other components of the energy absorber. For this purpose the membrane must enclose a certain volume of air within the energy absorber. The membrane is advantageously implemented as a micro perforated film.

By means of the at least one acoustic membrane that is provided according to the invention, sound waves incident on the energy absorber can be absorbed by setting the acoustic membrane vibrating and re-emitting the sound waves with a loss of energy. The loss of energy expresses itself here as a lower level of acoustic pressure and hence a lower pitch of the sound waves. Thanks to said effect, high frequencies that are perceived as unpleasant can thus be converted into lower frequencies that are perceived as pleasant. The loss of energy of the sound waves on the acoustic membrane can also cause a reduction of the sound level. The more strongly the membrane can be stimulated and hence can absorb energy, the greater is the loss of energy.

The membrane can advantageously be adjusted in terms of its geometry, such as its size, outline shape, thickness and/or thickness profile, for a defined resonant frequency. As a result, the membrane can be stimulated particularly strongly by a sound wave of such defined frequency and can thus contribute optimally to the sound attenuation. Specifically, defined levels of acoustic pressure, which for example are perceived as particularly unpleasant or which stimulate a defined vehicle structure such as the overhead system to vibration, can be "filtered out", i.e., converted to a lower level of acoustic pressure that is hardly audible or inaudible or harmless. Furthermore, the resonant frequency of the membrane can be adjusted by means of the selection of the material and/or the mechanical tension with which the membrane is held in the sound absorption device.

In a development of the impact-energy absorbing panel member of the invention, the sound absorbing or mitigating device can comprise at least two membranes and/or at least two groups of membranes dispersed within the device that differ with regard to the resonant frequency. This enables at least two defined resonant frequencies to be "filtered out" from sound incident on the energy absorber. Furthermore, membranes of different designs can be disposed at different points of the energy absorber, so that as a result a defined absorption of sound waves of defined frequency can take place at each of said positions.

Each membrane can be oriented in a defined direction in an in-use position of the impact-energy absorbing panel member in the vehicle in which the possible sound waves during operation are incident. If the panel member is part of an overhead system of a vehicle, it is advantageous if the membranes are oriented towards (i.e., facing) the passenger compartment. This means that a possible membrane plane can thus be oriented parallel to the XY direction of the vehicle (i.e., horizontal plane). It is understood that defined angles of incidence to the XY direction are in particular advantageous if the sound propagates in a diagonal direction through the passenger compartment to the panel member.

In one development, the energy absorber can comprise one or more panel members extending in a plane of the body of the vehicle. The panel member(s) include a membrane disposed at an angle to or parallel to the plane of the body. The angle can be less than or equal to 60°, preferably less than or equal to 30° or less than or equal to 10°. However, the membrane is most preferably disposed parallel to the plane of the body (e.g., substantially horizontally in a roof panel or substantially vertically in a door panel). In the in-use position, the impact-energy absorbing panel member can be disposed in the automobile with the plane of its body parallel to the XY plane of the automobile. Alternatively, the membrane can be disposed at an angle or parallel to the XY plane of the automobile.

In a further embodiment, an impact-energy absorbing panel member can comprise protrusions extending at an angle to the plane of the body and/or protrusions extending perpendicularly to the plane of the panel member. All protrusions are preferably disposed so as to extend away from one side of the panel member and/or in a direction away from the vehicle body. Said protrusions can be designed to absorb energy of motion by deformation, for example in the event of an impact. At least some of the protrusions can be in the form of sound-absorbing membrane protrusions, wherein the membrane protrusions can each comprise an acoustically active lateral surface with a membrane in the form of a first membrane. For this purpose, the acoustically active lateral surface can be in the form of a first membrane. Alternatively or additionally, a first membrane can be machined into the acoustically active lateral surface. The membrane protrusion can thus have a dual function, wherein it is used to absorb energy of motion by deformation and sound energy by stimulating its membrane.

The membrane can preferably have a firmly bonded connection to the panel member. The panel member can be made in one piece, in particular as an injection molded part. Furthermore, the protrusions and in particular the membrane protrusions can be conical, pyramidal or of a tapering wedge shape.

A further embodiment of the energy absorber can be characterized in that protrusions or at least the membrane protrusion(s) are each formed as a hollow protrusion open at the bottom and with a free end comprising an end face. The end face of the membrane protrusions can advantageously simply be at least partially in the form of a membrane (e.g., having a reduced thickness). The membrane can thus have a firmly bonded connection to the membrane protrusion. The membrane can thus be produced with the membrane protrusion in a molding process, in particular an injection molding process. Accordingly, the panel body of the energy absorber with the protrusions can be manufactured in a molding process, in particular an injection molding process.

In a further aspect of the energy absorber, at least the hollow protrusions in the form of membrane protrusions can have a constant wall thickness up to the regions with the membrane. The thickness of the membrane can be less than the wall thickness of the associated membrane protrusion. The wall thickness can be a multiple of the thickness of the membrane. The wall thickness can be greater than that of the membrane by a factor of at least 10, preferably at least 50 or at least 100. If as described above it is provided that the membrane forms the end face of the membrane protrusion and is disposed parallel to the plane of the body, then the regions of the membrane, as with the protrusions without a membrane, essentially contribute to the absorption of energy of motion by deformation of the respective protrusion, whereas the end face remains practically undeformed. The membrane protrusions can thus contribute to the absorption of the energy of deformation equally to the protrusions without membranes. Incidentally, the constancy of the wall thickness can vary within a range of defined tolerances. The wall thickness of the hollow protrusions can vary for shape stabilization, in particular in the region of the bottom opening.

In a further embodiment of the energy absorbing panel member, the hollow protrusion can define an internal space that extends over a height from the opening at the foot region to the end face. The internal space, and in particular its height, can be adapted here to a defined resonant frequency or to a defined range of resonant frequencies of an air column extending over the height within the internal space. In another aspect of the energy absorbing panel member, at least the hollow protrusions in the form of membrane protrusions have a constant wall thickness up to the regions with the membrane. The thickness of the membrane can be less than the wall thickness of the associated membrane protrusion. Once again, the wall thickness can be a multiple of the thickness of the membrane. The wall thickness can be greater than that of the membrane by a factor of at least 10, preferably at least 50 or at least 100.

If, as described above, it is provided that the membrane forms the end face of the membrane protrusion and is disposed parallel to the plane of the body, then the regions of the membrane, as with the protrusions without a membrane, contribute significantly to the absorption of the energy of motion with deformation of the respective protrusion, whereas the end face remains practically undeformed. The membrane protrusions can thus contribute equally as compared to the protrusions without membranes to the absorption of energy of deformation. Incidentally, the constancy of the wall thickness can vary within the region of certain tolerances. Furthermore, the wall thickness of the hollow protrusions can vary in the region of the opening in the foot region.

In an alternative embodiment of the energy absorber, at least some of the hollow protrusions that are open in the foot region can be spanned at their opening in the foot region by a membrane forming a second membrane. Thus when the sound is incident perpendicularly to the opening in the foot region and perhaps into the same, the second membrane can initially be stimulated and in turn outputs the then attenuated sound energy in the form of a sound wave through the internal space to the first membrane and thereby stimulates the first membrane to vibrate. The sound waves of the sound on both membranes can thus be attenuated. The same applies if the sound waves are initially incident on the end face and stimulate the first membrane there with a loss of energy, which in turn stimulates the second membrane with a further loss of energy. The second membrane can for example be formed by spanning or gluing the panel member of the energy absorber at the opening in the foot region with a membrane film. This enables the film for its part to comprise at least one and preferably a plurality of through openings that expose the associated openings of the protrusions in the foot region. To this extent the protrusions that comprise a second membrane but not having a first membrane can also be referred to as a membrane protrusion and can also be configured for the absorption of the energy of motion and for the absorption of sound energy.

Alternatively or additionally, it can be provided that at least one of the hollow protrusions that is open in the foot region comprises the second membrane at an internal distance from the opening in the foot region. A defined air column can thus also be set up, similarly to with the first membrane, by means of the distance of the opening in the foot region from the second membrane, which is preferably stimulated to resonance.

In an alternative embodiment of the energy absorber it can be provided that a membrane in the form of a third membrane is disposed between the protrusions and laterally fixed to an outer surface of the protrusions at the height below the first membrane. The third membrane can be disposed in a tensioned manner between the protrusions in this case. It can be connected in a firmly bonded manner to the protrusions. It can at least partly circumferentially enclose the protrusions. Said third membrane can in particular be configured to reduce sound energy that is incident on the energy absorber, in particular perpendicularly or almost perpendicularly to the plane of the panel member and in the direction from the end face of the protrusions to the body by converting the sound energy into energy of motion of the third membrane.

An overhead (i.e, roof) system with an energy absorber according to any one of the embodiments described above or below can be provided. The overhead system can comprise a roof panel, a roof liner and an energy absorber according to any one of the embodiments described above and/or below disposed between the roof liner and the roof panel, wherein the energy absorber comprises at least one acoustic membrane.

As described above, the energy absorber can comprise a planar body extending in a plane of the body. The body can comprise protrusions extending at an angle to the plane of the body and/or perpendicularly to the plane of the body in the same way with a free end in the direction of the roof panel. At least some of the protrusions can each be in the form of a membrane protrusion with a membrane disposed on the free end. The protrusions can be configured for the absorption of energy of motion (i.e., impacts during a crash) by deformation. The protrusions can be disposed on the end face spaced apart from the roof panel. This ensures that a deformation of the protrusions only occurs to absorb the energy of motion in the event of an impact or as a result of an accident in which the energy absorber is accelerated towards the roof panel.

The membrane protrusion can be in the form of a hollow protrusion that is open in the foot region. The membrane protrusion can be disposed so as to be open to the passenger compartment in the mounting position of the overhead system in the vehicle. This enables the optimal absorption of sound energy by the membrane to take place as described above. Preferably the energy-absorbing panel member of the energy absorber is designed such that it is self-supporting over its entire length.

Energy absorbers are preferably installed in the overhead system such that they are primarily disposed above the provided seats of the passenger compartment. Hence the sound energy in the immediate vicinity of the seats is absorbed in a passenger-friendly manner.

The use of the energy absorber according to the invention in an overhead system is described here without thereby wishing to limit the invention thereto. It is understood that the energy absorber according to the invention can be used anywhere that sound waves can impinge on the at least one membrane provided in the energy absorber for at least partial absorption.

DETAILED DESCRIPTION OF PREFERRED EMBODIMENTS

Figure 1:
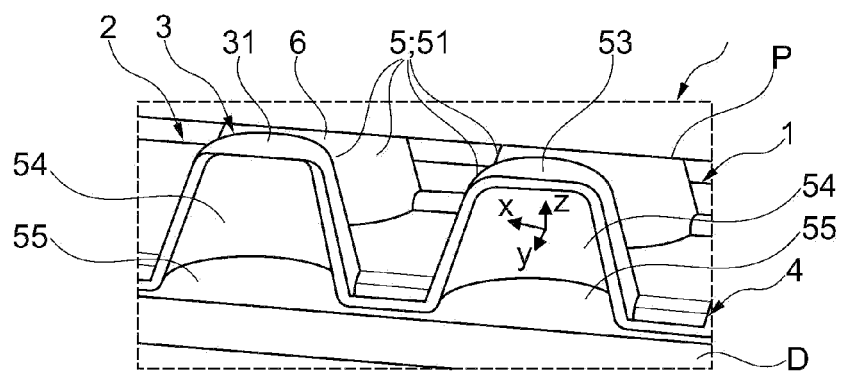
FIG. 1 shows a perspective longitudinal sectional view of a first embodiment of an overhead system with an energy absorber with a sound absorption device.

In FIGS. 1 through 8 in each case an overhead system 100 with an embodiment of an energy absorber panel member 1 is shown in a sectional view in a vehicle that is not illustrated further. The energy absorber 1 is installed in the overhead system 100 here by way of example. The overhead system 100 comprises an outer roof panel P (e.g., a rigid sheet metal panel) and a roof liner D (e.g., a soft fabric panel), wherein the energy absorber 1 is disposed between the roof panel P and the roof liner D. The energy absorber 1 comprises a sound absorption device 2 with at least one membrane 3 for the absorption of sound energy. In the in-use position of the energy absorber 1 in the overhead system 100 in the vehicle, the membrane 3 is disposed approximately perpendicularly to the z direction (i.e., in a horizontal plane) and hence in the direction towards the interior of the passenger compartment of the vehicle (not shown).

Figure 9:
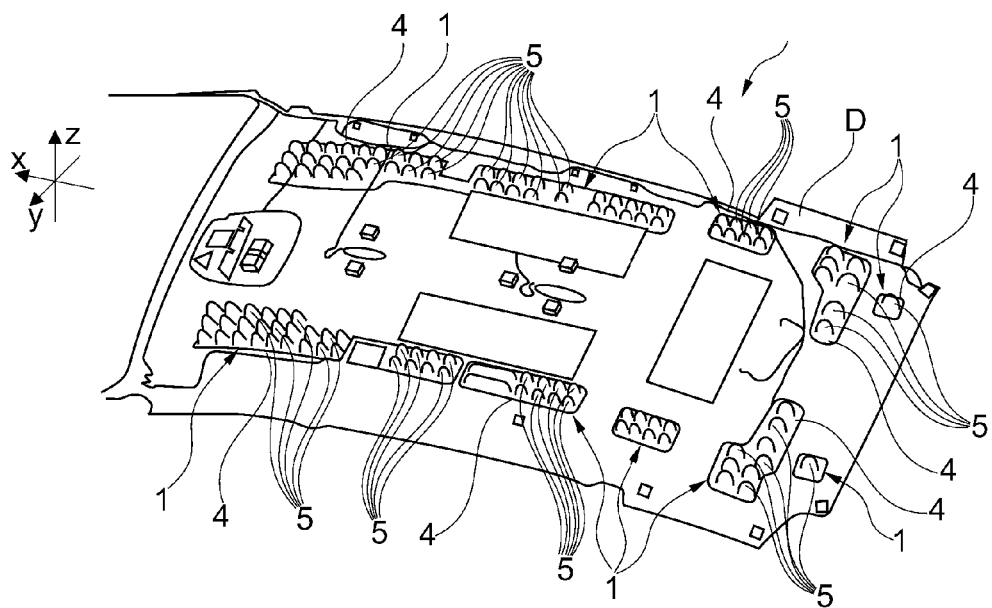
FIG. 9 shows a perspective view of a B side of the overhead system with a plurality of energy absorbers.

The energy absorber panel member 1 comprises a planar body section 4 extending in a plane of the body E, wherein the membrane 3 is disposed parallel to the plane of the body E. In the examples shown here, the plane of the body E can have a curved form corresponding to a concave roof shape of the overhead system as seen in FIG. 9. Body section 4 is a base or foot for defining a plurality of protrusions 5 extending perpendicularly to the plane of the body E, being configured for the absorption of energy of motion by deformation during an impact. All protrusions 5 extend from one side of the body section 4. There are at least some of the protrusions 5 that are each in the form of a membrane protrusion 6 (i.e., the membrane is integrally formed with the protrusion), wherein the membrane protrusions 6 each comprise an acoustically active lateral surface 61 with a membrane 3 in the form of a first membrane 31.

The protrusions 5 are each in the form of a hollow protrusion 51 with a free end extending away from the roof liner D in the in-use position. All protrusions 5 comprise a conical frustum shape with frustum-shaped sides and an end face 53 at the free end, wherein the end face 53 of the membrane protrusions 6 is in the form of a first membrane 31. The hollow protrusions 51 each comprise an internal space 54 that extends over a height h from the opening in the foot region 55 up to the end face 53. As mentioned above, in the mounting position the protrusions 5 extend away from the roof liner D, so that sound from the passenger compartment of the vehicle (not shown) enters the internal space 53 of the membrane protrusions 6 through the opening 55 and stimulates the first membrane 31 that is attached to the end face to vibrate with a loss of sound energy. The first membrane 31 outputs sound energy on both sides, wherein the level of acoustic pressure is reduced because of the loss of sound energy. The internal space 54 is configured with its height h for a defined frequency or frequency range of a tone in order to form a standing wave in the internal space in the best case.

The energy absorber panel member 1 is injection molded from plastic, wherein the first membrane 31 is injection molded with the body section 4 in an injection molding process and thus has a firmly bonded connection to the same.

As can be seen in particular in FIGS. 1-7, up to the region of the first membrane 31 the body section 4 has a constant wall thickness, which is at least several time greater than that of the first membrane 31. The thickness relationships shown here are purely by way of example. As can be seen from FIG. 8, the protrusions can have different dimensioning (in the x, y, and z orientations). The energy absorber 1 comprises two different groups of protrusions 5, wherein the protrusions shown on the left in FIG. 8 comprise openings whose diameter is about half the size of the diameter of the openings of the protrusions 5 shown on the right in FIG. 8. Accordingly, the first membranes 31 provided on the end face are also each made with different sizes and are thus designed for different frequencies that can stimulate the first membrane 31 to a natural frequency vibration.

As a result of the conical frustum shaped protrusions 5 facing away from the roof liner D and hence towards the roof panel P and the first membranes 31 on the end faces of the membrane protrusions 6 each running parallel to the body section 4, in the event of an impact energy of motion can be absorbed with deformation of the conical outer surface of the protrusions 5. The end faces 53 of the conical frustum shaped protrusions 5 do not play a part in the "extinction" of energy of motion incident on the body section 4 perpendicularly or almost perpendicularly to the plane of the body E by deformation, so that, although the first membranes 31 form the end faces 53 of the membrane protrusions 6, the membrane protrusions 6 can contribute to the extinction of the energy of motion to the same extent as the protrusions 5 not having a membrane. The membrane protrusions 6 thus have a dual function, i.e., they are used to absorb both energy of motion and also sound energy.

Figure 2:
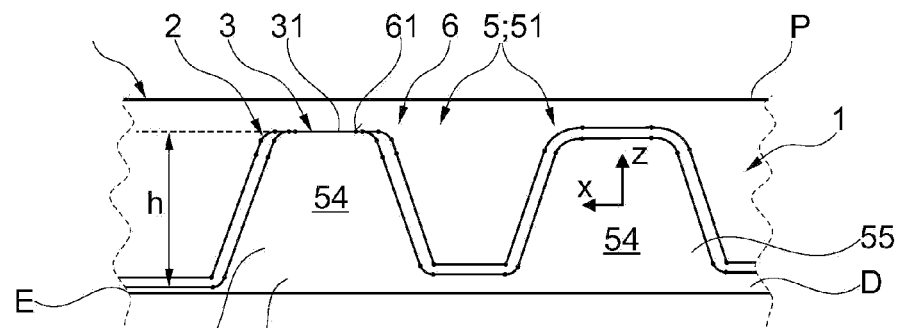
FIG. 2 is a longitudinal sectional plane according to FIG. 1.

The embodiment of the energy absorber 1 illustrated in FIGS. 3-6 differs in each case from that according to FIG. 2 in that other membranes 32, 33 are provided in addition to the first membrane 31. Energy absorbers without a first membrane but with a second membrane 32 and/or a third membrane 33 are not shown, but are included within the scope of the invention. For the sake of a clearer representation, in the embodiments according to the FIGS. 2-6 only one protrusion 5 not having a membrane (on the right in the figure) and one membrane protrusion 6 with a first membrane 31 (on the left in the figure) are shown. In a panel member having an array of protrusions laid out over an XY plane, the number of and placement of protrusions with membranes within the array can be selected according to a desired sound absorbing performance.

Figure 3:
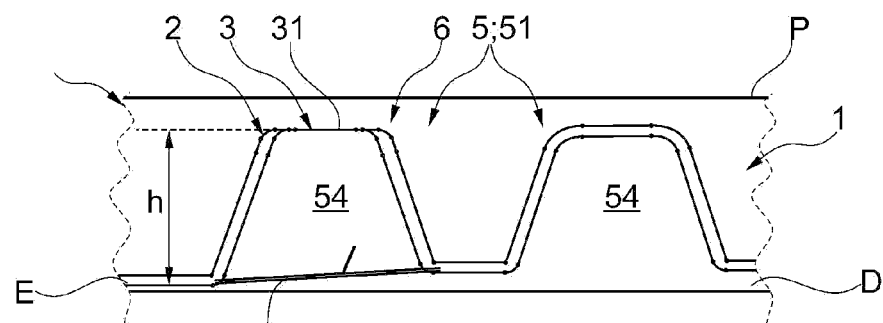
FIG. 3 shows a longitudinal sectional plane of the overhead system with a second embodiment of the energy absorber.

According to FIG. 3, the membrane protrusion 6 is additionally provided with a second membrane 32 that covers the opening 55. A sound wave incident on the opening 55 is will thus initially stimulate the second membrane 32 to vibrate. The second membrane will then also emit a sound wave in the direction towards the first membrane 31, which in turn then stimulates the first membrane 31 to vibrate. Thus, a two-fold loss of sound energy can be achieved by this means.

Figure 4:
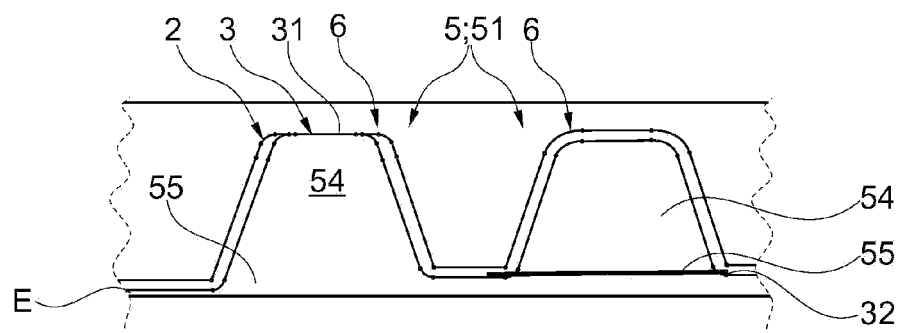
FIG. 4 shows a longitudinal sectional plane of the overhead system of a third embodiment of the energy absorber.

According to FIG. 4, the second membrane 32 covers the opening 55 of the protrusion 5 without a first membrane. Said protrusion 5 can thus also absorb sound energy by means of the second membrane 32 and thus acts as a membrane protrusion 6.

Figure 5:
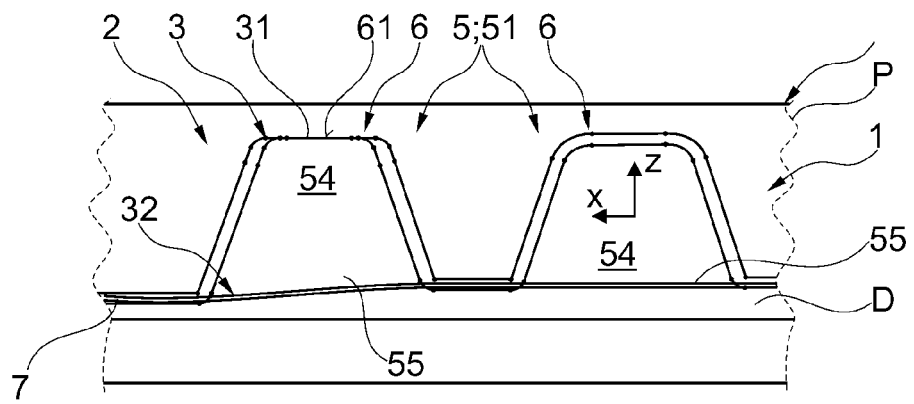
FIG. 5 shows a longitudinal sectional plane of the overhead system of a fourth embodiment of the energy absorber.

According to FIG. 5, the second membrane 32 is formed by the underside of the body section 4 of the energy absorber 1 with openings 55 of the protrusions 5 being covered by a film 7. It is not shown but it is envisaged that the film 7 does not cover certain ones of openings 55 of the protrusions 5 as it comprises apertures at said positions for example. It is not shown in the figures but it is also possible that the first membranes of the membrane protrusions are also formed by a film by the membrane protrusions being made open on the end face and the film covering said end face openings when forming the first membrane. In both cases the film 7 is joined to the body section 4 both fixedly and under tension, for example glued, such that the film 7 can form a vibratory acoustic membrane 31, 32.

Figure 6:
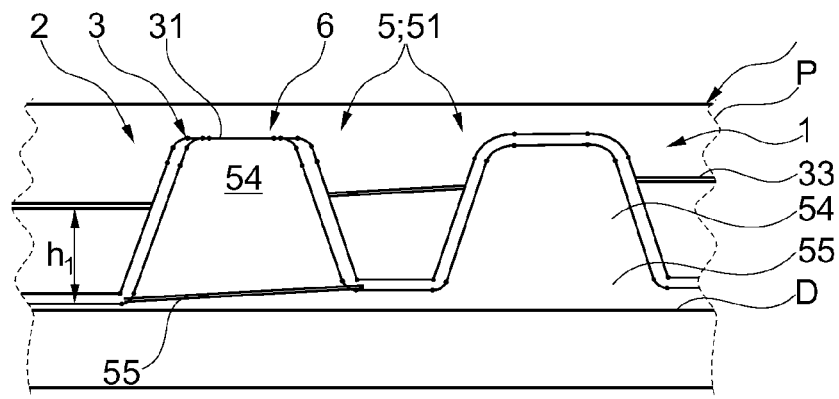
FIG. 6 shows a longitudinal sectional plane of the overhead system of a fifth embodiment of the energy absorber.

According to FIG. 6, a third membrane 33 is provided, being disposed approximately parallel to the plane of the body E between the protrusions 5 and fixed to the same as well as at a defined first height h1. As a result of its arrangement in the energy absorber 1, the third membrane 33 is configured to absorb in particular sound waves that are incident on the energy absorber 1 in the in-use position on the roof liner D.

Figure 7:
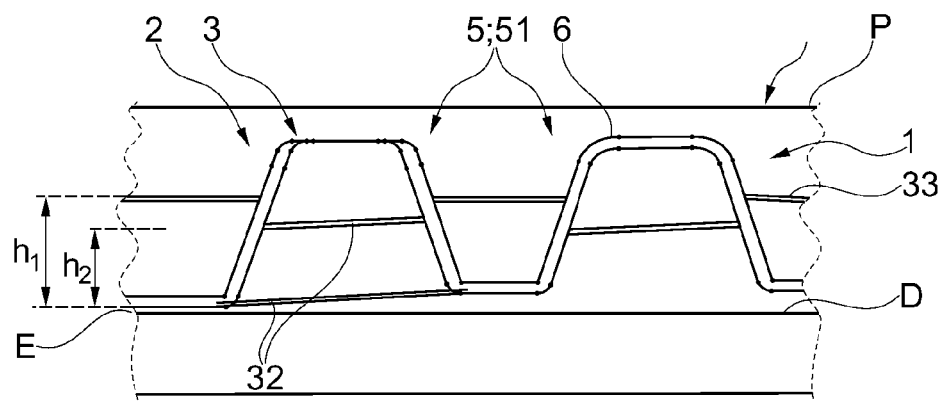
FIG. 7 shows a longitudinal sectional plane of the overhead system of a sixth embodiment of the energy absorber.
Figure 8:
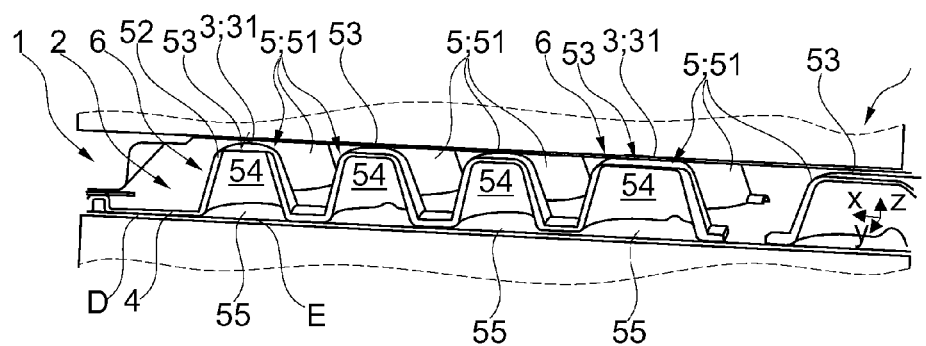
FIG. 8 shows a perspective longitudinal sectional view of the overhead system of a seventh embodiment of the energy absorber.

According to FIG. 7, a further possible combination is shown, in which the second membrane 32 is disposed at a defined second height h2 and spaced apart from the opening 55 in the internal space 54 of the protrusions 5. In addition, a further second membrane 32 is provided only for the membrane protrusion 6 and spans the opening 55 in the foot region, as with the other embodiments according to FIGS. 3, 5, and 6. In this case, the sound energy can be reduced by the three membranes 31, 32 disposed on the membrane protrusions 6 and thus at three points and can be strongly reduced in its frequency.

It is understood that further combinations of the membranes 31-33 and variations in the geometric configuration of the protrusions 5 are possible here in order by this means to specifically absorb sound energy of sound waves of defined frequencies.

In FIG. 9, the overhead system 100 is shown with a view of the so-called B side, i.e., of the side of the roof liner D facing the roof panel P in the installation position, wherein the roof panel is omitted for a better illustration of the overhead system 100 with the energy absorber 1. This means that the passenger compartment is below the roof liner D in the installation position of the overhead system 100 in the vehicle according to the view in FIG. 8. In the overhead system 100, the energy absorber 1 comprises a plurality of body sections 4 approximately disposed in a plane and each with protrusions 5, of which some are in the form of membrane protrusions 6, which cannot be seen in this view.

As can be clearly seen solely from the positioning of the body sections 4 of the energy absorber 1 in the overhead system 100 according to FIG. 9, the bodies 4 are primarily on the wheel side and are thus disposed above the seats of the vehicle in order to achieve optimum absorption of sound in exactly said regions that acts directly on the seats.

What is claimed is:

1. A body panel system for a vehicle, comprising:
a rigid exterior body panel;
an interior trim liner; and
an impact-energy absorbing panel member disposed between the body panel and trim liner, wherein the panel member comprises protrusions adapted to deform in a crash to absorb impact energy and at least one acoustic membrane adapted to absorb acoustic energy as a Helmholtz resonator, wherein at least one protrusion includes a foot region that is entirely open ended, wherein the acoustic energy stimulates the at least one acoustic membrane resulting in a loss of acoustic energy, and wherein a level of acoustic pressure is reduced as a result of the loss of acoustic energy.

2. The system of claim 1 wherein the membrane is comprised of a film.

3. The system of claim 1 wherein the membrane is comprised of a plate oriented substantially parallel to the body panel and having a membrane thickness less than a thickness of the protrusions.

4. The system of claim 1 wherein the membrane has a geometry and thickness adapted to absorb sound at a defined resonant frequency.

5. The system of claim 1 wherein the impact-energy absorbing panel member comprises a substantially planar body section defining the foot region of the protrusions, and wherein the protrusions are frustum shaped to absorb energy of motion by deformation during an impact.

6. The system of claim 5 wherein a plurality of the protrusions each has an acoustically active surface integrally forming a respective membrane.

7. The system of claim 6 wherein the protrusions with an integrally-formed membrane have an open foot region, frustum-shaped sides, and a free end with an end face, and wherein the end face provides the acoustically active surface as a result of having a thickness less than about one tenth a thickness of the sides.

8. The system of claim 7 wherein each protrusion with an integrally-formed membrane defines an internal space that extends over a height (h) from the foot region to the end face, wherein the height (h) determines the defined resonant frequency.

9. The system of claim 5 wherein the membrane spans the foot region of a plurality of the protrusions.

10. The system of claim 5 wherein the protrusions have an open foot region, frustum-shaped sides, and a free end with an end face, and wherein the membrane spans the frustum-shaped sides between the open foot region and the end face within a respective protrusion.

11. The system of claim 5 wherein the protrusions have an open foot region, frustum-shaped sides, and a free end with an end face, and wherein the membrane extends between the frustum-shaped sides of a plurality of the protrusions.

12. The system of claim 11 wherein the membrane further extends within at least one of the protrusions spanning the frustum-shaped sides between the open foot region and the end face of the at least one protrusion.

13. An overhead system for a vehicle, comprising:
a rigid exterior roof panel;
an interior roof liner; and
an impact-energy absorbing panel member disposed between the roof panel and the roof liner, wherein the panel member comprises protrusions adapted to deform in a crash to absorb impact energy and at least one acoustic membrane adapted to absorb acoustic energy as a Helmholtz resonator, wherein each protrusion includes a foot region that is entirely open ended.

* * * * *